Sept. 9, 1958     J. A. POTTER     2,851,569
ELECTRICAL AIR GAP GAGE
Filed Dec. 30, 1953     2 Sheets-Sheet 1
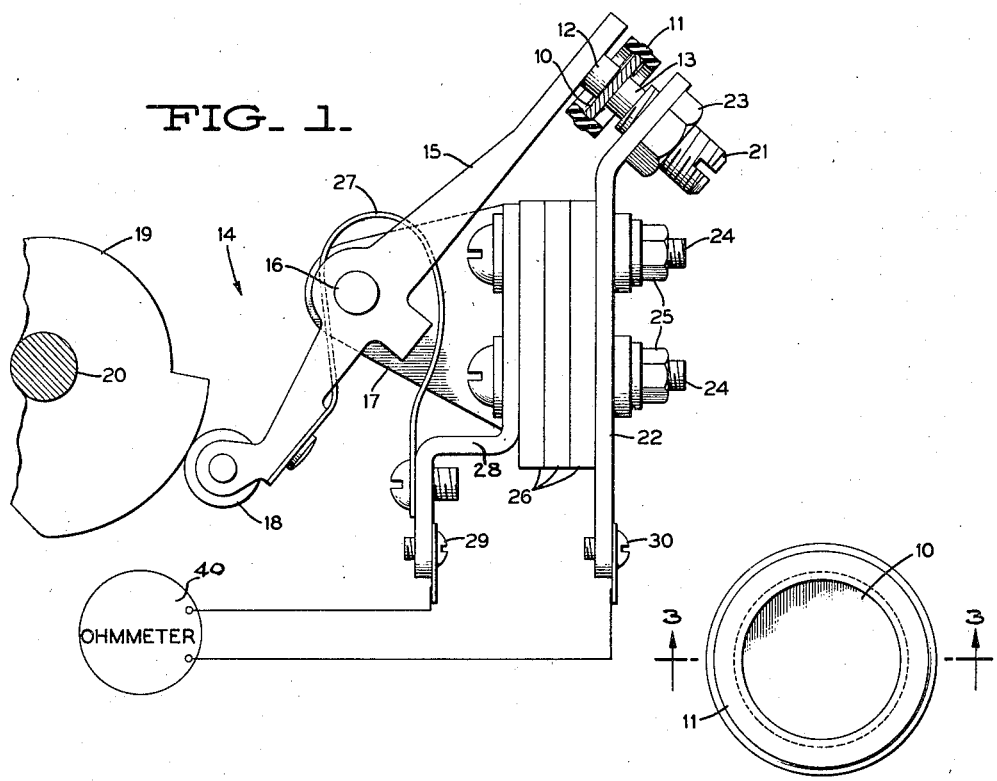
FIG. 1.
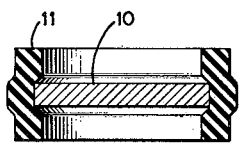
FIG. 2.
FIG. 3.
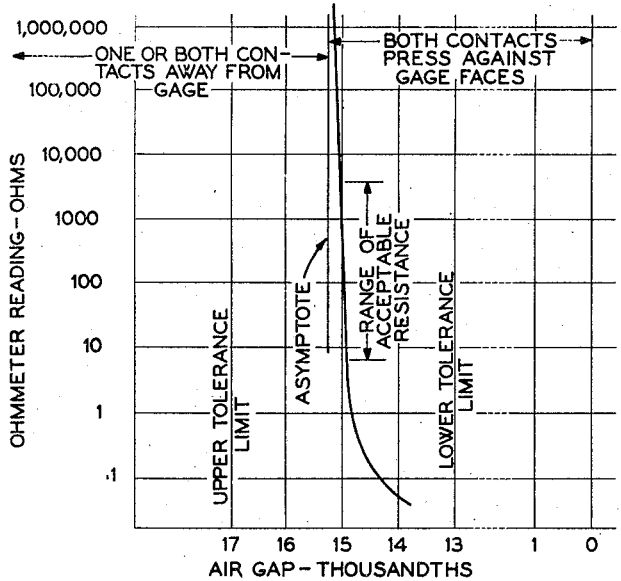
FIG. 4.
INVENTOR.
JAMES A. POTTER
BY
Dewey J. Cunningham
ATTORNEY Sept. 9, 1958 J. A. POTTER 2,851,569
ELECTRICAL AIR GAP GAGE
Filed Dec. 30, 1953 2 Sheets-Sheet 2

INVENTOR.
JAMES A. POTTER
BY
Dewey J. Cunningham
ATTORNEY

United States Patent Office 2,851,569
Patented Sept. 9, 1958

2,851,569

ELECTRICAL AIR GAP GAGE

James A. Potter, Binghamton, N. Y., assignor to International Business Machines Corporation, New York, N. Y., a corporation of New York Application December 30, 1953, Serial No. 401,202

3 Claims. (Cl. 201—50)

This invention relates to method and apparatus for determining the air gap setting between spaced electrical conducting members.

An object of the present invention is to provide improved electrical air gap gage apparatus.

Another object of this invention resides in the provision of an improved method of determining the air gap between electrical conducting members.

Still another object of the invention is to furnish improved means for accurately setting the air gap between electrical contacts.

A further object of the present invention is to provide improved electrical air gap gage apparatus for determining if the distance between a pair of electrical contacts is within a predetermined range of distances.

A still further object of this invention resides in the provision of an improved electrical air gap gage which is simple in design, economical to manufacture and extremely accurate and fast in performing the functions described in the paragraphs above.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 1 is a side elevation of a circuit breaker showing one embodiment of the present invention between the contacts thereof;

Fig. 2 is a plan view of the embodiment of the air gap gage shown in Fig. 1;

Fig. 3 is a sectional view taken on lines 3—3 of Fig. 2;

Fig. 4 shows a characteristic curve relating the resistance between the contacts having the aforementioned one embodiment therebetween and in contact therewith, and the air gap;

Similar reference numerals represent similar parts throughout the drawings.

Figure 5:
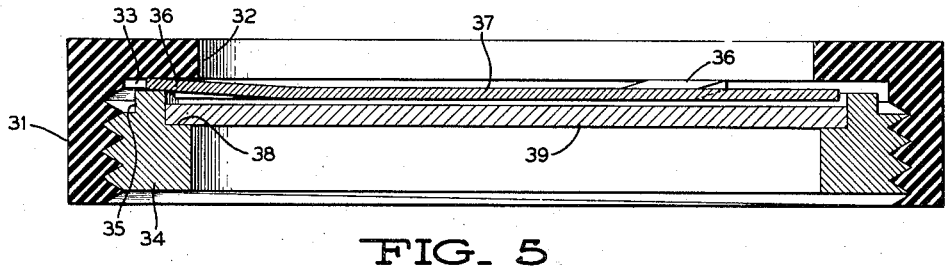
Fig. 5 shows a second embodiment of the present invention.

At the present time the apparatus used for determining the air gap setting between electrical electrodes or contact members is in the form of a metallic sheet, or disc, which is used as a feeler gage. For example, in setting the air gap between the electrodes of a spark plug, a metal disc having a thickness equal to the desired air gap is placed between the electrodes and the distance is adjusted between the electrodes until they engage the disc. The operator, by utilizing a certain degree of skill, may provide a more accurate adjustment by varying the electrode spacing until the "feel" is just right. That is, the electrode spacing is varied until the disc is tightly held between the electrodes. Then the spacing is increased until the disc moves somewhat freely between the electrodes. This is where the "feel" is encountered. From the above it will be seen that the spacing finally arrived at will vary with different operators since each operator has his own particular sense of "feel." The method also involves considerable time since the operator may have difficulty in determining what he believes to be the correct "feel" and may involve undershooting or overshooting of the correct adjustment.

The present invention has been designed to eliminate the necessity of a skilled operator to determine the correct "feel" by providing apparatus which will now be described in detail. Referring to Figs. 2 and 3, there is shown a disc 10 which is composed of some form of pressure sensitive resistance material such as carbon or semi-conductive rubber. This disc is shown to be round only by way of example. The disc could just as well be square, rectangular or any other desired configuration. The term disc is meant to include all of these possible variations. As for thickness, the disc is approximately the same as the desired air gap. For the sake of convenience only, an annular insulated ring 11 is adapted to engage the periphery of the disc. The ring may be used for ease in handling the disc. However, it serves no useful purpose in determining the air gap setting.

Fig. 1 shows the gage of Figs. 2 and 3 mounted between contacts 12 and 13 of a rocker type circuit breaker, illustrated generally by reference numeral 14. The circuit breaker illustrated is shown, by way of example only, to be of the rocker type. That is, a rocker arm 15 is pivotally mounted on support 17 by means of a pivot pin 16. Contact 12 is fixedly mounted on one end of the rocker arm and a cam follower, in the form of a roller 18, is rotatably mounted at the other end of said rocker arm. Roller 18 is adapted to ride on the surface of cam 19 which is driven through shaft 20 by appropriate drive means (not shown).

Adjustable contact 13 is mounted at one end of a screw 21 which is threadingly received in a support member 22. A lock nut 23 is furnished for locking the screw relative to support 22 when the proper adjustment of contact 13 is provided. Supports 17 and 22 are secured together by bolts 24 and nuts 25, said supports being spaced from each other by a plurality of laminations 26 which are constructed of insulating material. A leaf spring 27 is secured to one end of the rocker arm adjacent the cam follower and to an extension 28 of support 17, said leaf spring being looped around pivot pin 16. The operation of this spring is to maintain roller 18 in engagement with cam 19. In so doing the spacing of contacts 12 and 13 will vary over a prescribed range which is a function of the difference between the high and low points of cam 19. The air gap which is to be determined is that existing between the contacts at the time roller 18 is at the high point of cam 19.

The determination of the air gap setting is made by first inserting the disc 10 between contacts 12 and 13. Then, screw 21 is adjusted until roller 18 is lifted off the high point of cam 19. An ohmmeter 40 is placed across terminals 29 and 30, said terminals being connected to contacts 12 and 13, respectively, and a first reading is made. The resistance value will be quite low. Screw 21 is then backed off until the ohmmeter reading begins to rise. This increase in resistance indicates that roller 18 has engaged the cam high point. The ohmmeter indication is further observed and adjustment continues until a predetermined resistance is indicated. The particular resistance indication used may be arbitrarily selected. For example, after a number of contacts have been set and placed under test, an optimum setting may be determined. As will be observed from Fig. 4, the resistance rises rapidly with very small increases in air gap. In fact, the ohmmeter may run off the scale and the air gap may still be within the tolerance permitted. It is preferable, however, to select an ohmmeter reading on the scale which will provide an optimum setting for the cam used with the circuit breaker.

The reason the air gap may be so accurately set is that a means is provided for indicating in terms of an ohmmeter deflection just how much pressure is applied to the gage. When a feeler gage made of steel, for example, is used it is not possible to accurately determine just how much pressure is being applied thereto by the contacts. Accuracy is limited by the skill of an operator in determining the pressure by "feel." However, in the instant invention, a semi-conductive material is used as the feeler gage. The material which is to be used is of such construction that the resistance thereof varies with applied pressure. Therefore, the reading of the ohmmeter is an accurate measurement of the applied pressure. This measurement permits the provision of a "feel" which will always be the same and not subject to the skill of an operator.

The instant invention is so sensitive to change in air gap that, after lock nut 23 has been set, slight pressure applied to the adjustable contact toward the fixed contact will be sensed by the ohmmeter.

The embodiment of the invention described above is useful in making an initial setting of the contact spacing. After a long period of use, the spacing will change. For example, the spacing may decrease so that the make and break time of the contacts changes. Certain tolerances in air gap spacing are allowed. Rather than change the initial setting of the adjustable contact, a second embodiment of the invention, utilizing the same principle as the first embodiment, is provided for insertion between the contacts. This device then determines if the air gap is within prescribed tolerances.

Figure 6:
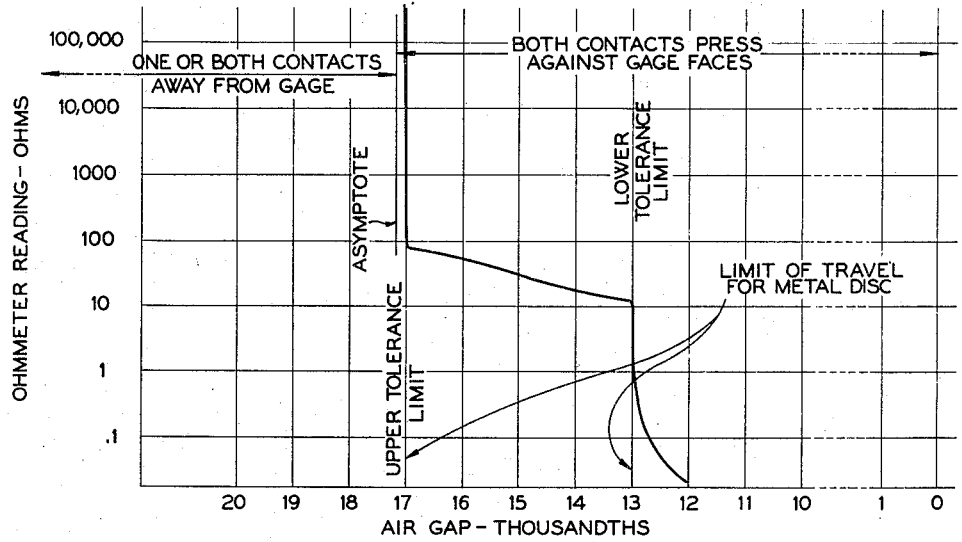
Fig. 6 shows a characteristic curve for the second form of the invention.
Figure 7:
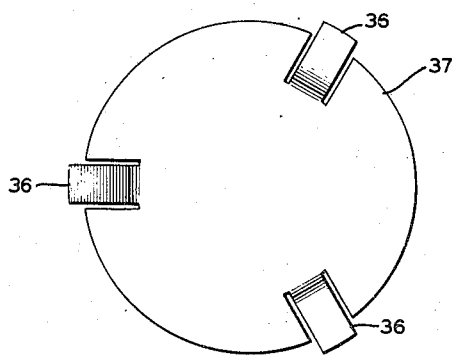
Fig. 7 is a plan view of the disc means utilized in the second form of the invention.

Referring to Figs. 5, 6 and 7, the second embodiment comprises an annular ring 31 which has a flange 32 adjacent one edge thereof, said flange extending towards the inside of said ring and providing a shoulder 33. The ring is threaded internally from the other edge of said ring to shoulder 33. Annular ring 31 and flange 32 are constructed of insulating material. A second annular ring, illustrated by reference numeral 34, has external threads on the outer periphery thereof which are adapted to cooperatively engage the internal threads of ring 31. An annular rib 35 projects from the upper edge of ring 34 and cooperates with shoulder 33 to hold spring fingers 36 of metal disc 37 therebetween.

An annular seat 38 is provided adjacent the inner periphery of rib 35. A disc 39 is adapted to have the outer periphery thereof mounted in seat 38 with a press fit. Disc 39 is to be constructed of a material whose resistance characteristics vary with pressure. For example, the disc may be composed of carbon or semi-conductive rubber.

The assembly of the second embodiment described above is very simple. It is but necessary to insert disc 37 inside annular ring 31 so that fingers 36 engage shoulder 33, and then screw ring 34 into ring 31 until rib 35 engages the spring fingers 36. In the construction shown, it is not desired to hold the spring fingers rigidly between rib 35 and shoulder 33. Instead, the fingers should be permitted to move relative to said rib and shoulder. The reason why this arrangement is necessary will be obvious from the description of the use of this embodiment. When the gage shown in Fig. 5 is inserted between contacts such as those shown in Fig. 1, a determination can be made as to whether the contact air gap is between certain prescribed upper and lower tolerance limits. Referring to Fig. 6, the characteristic curve for a particular gage is shown. If the contacts do not engage the outer surfaces of discs 37 and 39, the ohmmeter reading will likely be so high as to be completely off scale. When engagement of the contacts with the surfaces does occur, and pressure is applied through such engagement, the ohmmeter reading is taken. By way of example, if the ohmmeter reading is between approximately ten ohms and one hundred ohms the air gap is determined to be within the upper and lower tolerance limits.

From Fig. 6, it will be seen that after both of the contacts engage the faces of discs 37 and 39, a certain amount of pressure must be applied by the contacts to the discs before a reading can be obtained. If the air gap is slightly above seventeen thousandths of an inch the ohmmeter reading may be anywhere between one hundred ohms and one hundred thousand ohms. Should the air gap be between seventeen thousandths and thirteen thousandths of an inch, varying degrees of pressure are applied to the two discs. The amount of pressure applied determines the spacing of the discs. Once the discs contact each other, the resistance reading drops sharply. The shape of the curve below .013" is dependent upon the design of leaf spring 27, and is of no significance in the instant invention.

From the above it will be seen that a very accurate determination can be made with regard to whether the air gap between a particular pair of contacts is within prescribed upper and lower tolerance limits. The gage is constructed so that the distance between the outer faces of the discs, when disc 37 is in its normal position, is equal to the upper tolerance limit for the air gap between the contacts. When disc 37 is moved toward disc 39 and into engagement therewith, the distance between the aforementioned outer faces is equal to the lower tolerance limit for the air gap between the contacts. Thus, the lower tolerance limit is determined by the total thickness of disc 37 and 39. The total distance of travel allowed disc 37 represents the amount of tolerance permitted in the air gap.

It will be seen that I have provided in the first embodiment an air gap gage which may be used to accurately set the air gap between a pair of electrodes or contacts. The second embodiment may be used to determine if the air gap is still within prescribed tolerance limits.

The accuracy of air gap setting is extremely important to assure correct timing of the make and break of the contacts. The present invention provides means whereby the initial setting may be made with a minimum of time and skill on the part of the operator. The second embodiment of the invention prevents the necessity of making a completely new adjustment of the contacts after they have been in use over a period of time.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. An electrical air gap gage for insertion between spaced apart electrodes to determine if the air gap therebetween is within a predetermined range of air gaps, disc means, said disc means comprising a first disc of pressure sensitive resistance material and a second disc, said first disc being adapted to engage one of said electrodes and said second disc being adapted to engage the other of said electrodes, and conducting means in contact with each of said discs for providing electrical conduction therebetween and for normally spacing said discs apart, the spacing of said discs being a function of the electrode air gap, the pressure applied by said second disc to said first disc through said conducting means also being a function of said electrode air gap.

2. An electrical air gap gage for insertion between spaced apart electrodes to determine if the air gap therebetween is within a predetermined range of air gaps, disc means, said disc means comprising a first disc of pressure sensitive resistance material and a second disc, said first disc being adapted to engage one of said electrodes and said second disc being adapted to engage the other of said electrodes, and means at the outer peripheries of said disc means for providing electrical contact between said first and second discs and for normally spacing them apart at the electrode contacting portions thereof, the electrode spacing determining the spacing of said first and second discs and the pressure applied at the points of electrical contact between said discs.

3. An electrical air gap gage comprising a first disc constructed of a pressure sensitive resistance material and a second disc, conductive supporting means for said disc, and resilient means on said second disc for engaging said conductive supporting means and normally spacing said discs apart but allowing said discs to engage when sufficient pressure is applied thereto, said resilient means being constructed of a conductive material.

References Cited in the file of this patent

UNITED STATES PATENTS 2,626,381  Olson _____ Jan. 20, 1953

FOREIGN PATENTS 427,705  Great Britain _____ Jan. 22, 1934